US005937495A

United States Patent [19]

Kuo

[11] Patent Number: 5,937,495

[45] Date of Patent: Aug. 17, 1999

[54] TOOL AND PLUG FOR BLOCKING ENGINE OIL GALLERY ACCESS HOLE

[75] Inventor: Shau-fen Kuo, W. Bloomfield, Mich.

[73] Assignee: Chrysler Corporation, Auburn Hills, Mich.

[21] Appl. No.: 08/969,380

[22] Filed: Nov. 13, 1997

Related U.S. Application Data

[62] Division of application No. 08/664,748, Jun. 17, 1996, Pat. No. 5,771,853.

[51] Int. Cl.[6] ........ B23P 19/04

[52] U.S. Cl. ........ 29/256; 29/266

[58] Field of Search ........ 29/256, 266, 244, 29/278

[56] References Cited

U.S. PATENT DOCUMENTS

| | | | |
|---|---|---|---|
| 3,949,459 | 4/1976 | Marenchin | 29/256 |
| 3,961,410 | 6/1976 | Reed | 29/256 |
| 4,761,868 | 8/1988 | Allison | 29/256 |
| 4,798,106 | 1/1989 | Foster | 29/256 |
| 5,165,158 | 11/1992 | Markisello | 29/256 |
| 5,170,548 | 12/1992 | Ramirez | 29/266 |
| 5,233,741 | 8/1993 | Maynard | 29/266 |
| 5,771,853 | 6/1998 | Kuo | 123/196 R |

*Primary Examiner*—David A. Scherbel
*Assistant Examiner*—Lee Wilson

[57] ABSTRACT

A solid, steel plug includes a disc-shaped plug portion and a disc-shaped flange on one of the plug portion and extending radially outwardly therefrom. The plug can be advanced into an oil gallery access hole in a cylinder head of an engine to seal the hole. A tool is disclosed for urging the plug into the hole. The tool includes a base that is configured for flushly fitting on the head over the access hole, and a bolt that is threadably engaged with the base for urging the plug into sealing engagement within the hole.

4 Claims, 1 Drawing Sheet

TOOL AND PLUG FOR BLOCKING ENGINE OIL GALLERY ACCESS HOLE

This application is a divisional of Ser. No. 08/664,748 filed on Jun. 17, 1996 which is now U.S. Pat. No. 5,771,853.

FIELD OF INVENTION

The present invention relates generally to vehicle engines, and more particularly to methods and apparatus for sealing oil gallery access holes that are formed in engine cylinder heads during manufacture.

BACKGROUND OF THE INVENTION

It is commonly necessary to bore access holes into engine cylinder heads during manufacture. Thereby, access to the oil gallery is permitted for completing engine assembly. Of course, after assembly the access holes must be sealed.

A common way to seal the oil gallery access holes is to insert a hollow, cup-shaped seal into the hole. It happens, however, that such access hole seals in vehicle engines might leak oil. In other words, the seals might not properly operate to completely block the access holes. Such oil leaks, like all engine oil leaks, are undesirable in that leaks raise the spectre of losing engine lubrication and thus ruining the engine. Furthermore, with particular regard to oil gallery access hole leaks, such leaks are difficult at best to repair in the field, and frequently require removing the engine from the vehicle and partially disassembling the engine to fix the leaks. As recognized by the present invention, however, it is possible to provide a means for quickly and effectively remedying oil gallery access hole leaks, without requiring removal of the engine.

Accordingly, it is an object of the present invention to provide a method and apparatus for remedying oil gallery access hole leaks in vehicles. Another object of the present invention is to provide a method and apparatus for remedying oil gallery access hole leaks in vehicles which does not require removing the engine from the vehicle. Still another object of the present invention is to provide a method and apparatus for remedying oil gallery access hole leaks in vehicles which is easy to use and cost-effective.

SUMMARY OF THE INVENTION

A device is disclosed which is advanceable into an oil gallery access hole of a vehicle engine to seal the hole. The device is made of a unitary solid body that includes a circularly-shaped flat distal face and a disc-shaped intermediate portion defining an intermediate diameter. A shoulder portion which has a curved outer surface interconnects the distal face and the intermediate portion. Per the present invention, a proximal disc-shaped flange is contiguous to the intermediate portion, with the proximal flange defining a proximal diameter greater than the intermediate diameter.

In a preferred embodiment, a cup-shaped seal that defines an upper edge is disposed in the access hole. In accordance with the present invention, the intermediate portion is disposed within the cup-shaped seal and the flange abuts the upper edge of the seal.

A tool is also provided for advancing the plug into the hole. The engine includes a surface portion that surrounds the access hole, and the tool includes a base formed with an inner surface shaped to flushly abut the surface portion. Consequently, the base can be stably positioned against the surface portion over the access hole. Additionally, the tool includes an elongated urging member that is threadably engaged with the base for movement between a first position, wherein the urging member is distanced from the access hole, and a second position, wherein the urging member is advanced into the access hole for urging the plug into the access hole to thereby seal the hole.

As described in detail below, the surface portion of the engine defines a topography that includes at least two mutually orthogonal planes. Accordingly, the inner surface of the base is formed with a first wall and a second wall orthogonal to the first for respectively closely conforming to the orthogonal planes.

A vehicle engine incorporating the plug is also disclosed.

In another aspect, a plug is disclosed for blocking an oil gallery access hole in an engine. The plug of the present invention includes a solid, steel, substantially disc-shaped plug portion. Moreover, the plug includes a solid, steel, disc-shaped flange formed integrally with the plug portion on one end thereof. The flange extends radially outwardly from the plug portion.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
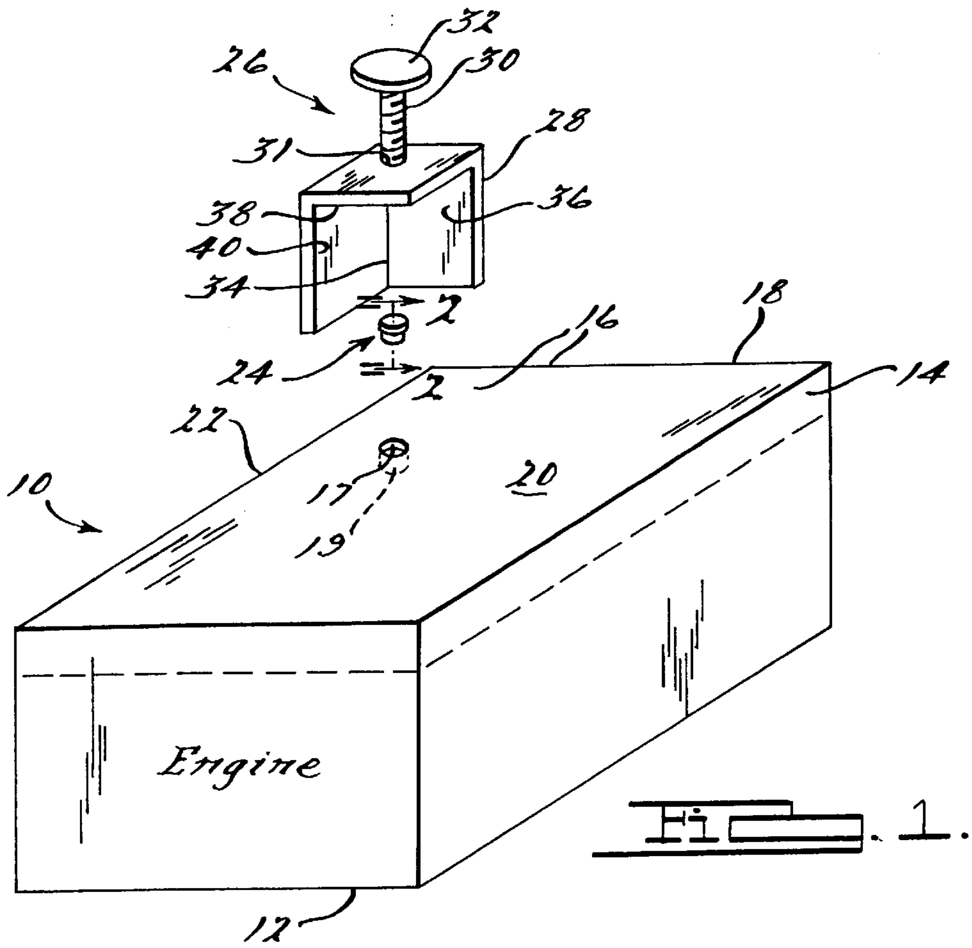
FIG. 1 is a perspective view of the tool and plug of the present invention, in an exploded relationship with a vehicle engine, with portions shown in phantom.

Referring initially to FIG. 1, a vehicle is shown, generally designated 10, which includes an engine 12 having a cylinder head 14. The cylinder head 14 defines a surface portion 16 that surrounds an oil gallery access hole 17, with the access hole 17 being formed in the head 14 during manufacture. A hollow cup-shaped seal 19 is disposed in the hole 17 to block the hole 17. As shown, the surface portion 16 defines a topography that can include a first plane 18, a second plane 20, and a third plane 22, with the planes 18, 20, 22 being mutually orthogonal.

A solid, steel, plug 24 is can be advanced into the hole 17 to establish a better seal than that provided by the cup-shaped seal 19. Thereby, undesirable leaking of oil through the hole 17 is more completely blocked. Details of the plug 24 are set forth below in reference to FIG. 2.

A tool, generally designated 26, is provided for urging the plug 24 into the hole 17. As shown, the tool 26 includes a base 28 and an elongated urging member, preferably a bolt 30 that is threadably engaged with a threaded bore 31 which is formed in the base 28. In the preferred embodiment, the bolt 30 includes a manually grippable head 32 for facilitating convenient manipulation of the bolt 30. Alternatively, the urging member of the present invention can be slidably engaged with the base 28 for reciprocating motion relative thereto.

As shown in FIG. 1, the base 28 is formed with an inner surface 34. In accordance with the present invention, the inner surface 34 defines a topography that complements the topography of the surface portion 16 of the engine 12, thereby facilitating flush positioning of the inner surface 34 against the surface portion 16. With this cooperation of structure, the base 28 can be stably positioned by hand against the engine 12. In other words, the inner surface 34 of the base 28 is formed with a first wall 36, a second wall 38, and a third wall 40, with the walls 36, 38, 40 being mutually orthogonal for respectively closely conforming to the orthogonal planes 18, 20, 22 of the surface portion 16, such that the base 28 does not rock or otherwise easily move on the engine 12 when positioned against the surface portion 16. It is to be understood, however, that the engine 12 can have an alternate topography that is different from the one shown, in which case the inner surface 34 of the base 28 will be formed with a topography that is complementary to the alternate topography of the engine 12, to permit flush positioning of the base 28 against the engine 12.

With the above disclosure in mind, it may now be appreciated that the bolt 30 can be manipulated to urge the plug 24 into sealing engagement with the access hole 17. More particularly, base 28 is positioned by hand against the surface portion 16 of the engine 12, over the access hole 17, with the bolt 30 in a first position. In the first position, the bolt 30 is distanced from the access hole 17. Then, the plug 24 is disposed by hand in the access hole 17. Next, the bolt 30 is rotated to a second position, wherein the bolt 30 is advanced into the access hole, thereby urging the plug 24 into the access hole 17 to thereby seal the hole 17.

As recognized by the present invention, the plug 24 is dimensioned to fit tightly in the access hole 17. Stated differently, a tight interference fit is established between the plug 24 and access hole 17.

Figure 2:
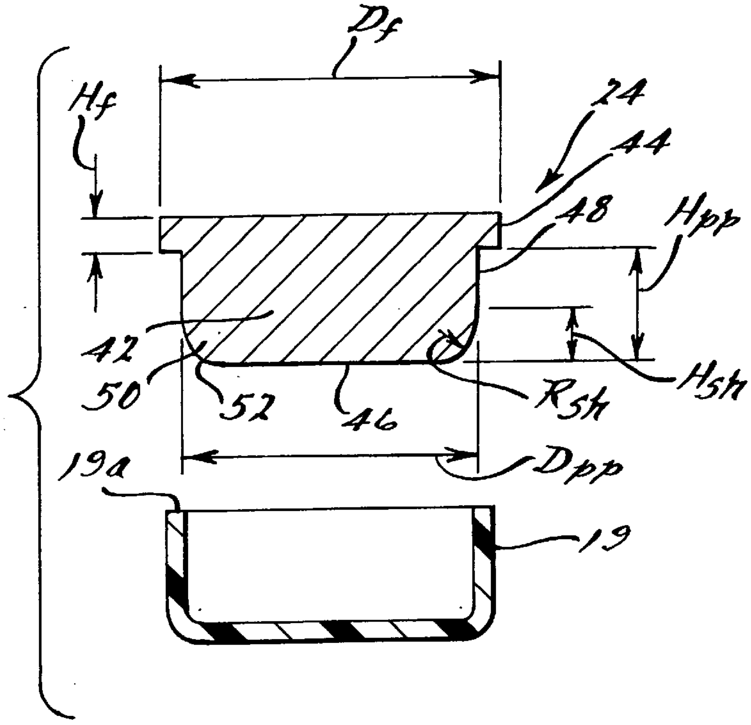
FIG. 2 is a cross-sectional view of the plug of the present invention, as seen along the 2—2 in FIG. 1, in an exploded relationship with a seal.

FIG. 2 shows the details of the plug 24. As shown, the plug 24 is solid. Preferably, it is made of steel. In the presently preferred embodiment, the plug 24 includes a solid, steel, substantially disc-shaped plug portion 42. Also, the plug 24 includes a solid, steel, disc-shaped flange 44 that is formed integrally with the plug portion 42 on one end of the plug portion 42. As shown in FIG. 2, the flange 44 extends radially outwardly from the plug portion 42.

As further preferred, the plug portion 42 includes a circularly-shaped flat distal face 46. It can be appreciated in cross-reference to FIGS. 1 and 2 that the plug 24 is advanced into the access hole 17, distal face 46 first, until the plug portion 42 is disposed flushly inside the cup-shaped seal 19.

A disc-shaped intermediate portion 48 is proximal to the distal face 46, with a shoulder portion 50 interconnecting the distal face 46 and the intermediate portion 48. As shown, the shoulder portion 50 has a curved outer surface 52. Accordingly, the plug portion 42 is substantially disc-shaped.

I have found that owing to the size of many, if not most, oil gallery access holes, the plug 24 can be made with the following dimensions for advantageously effecting a tight interference fit between the plug 24 and the access hole 17. The plug portion 42 defines a height $H_{pp}$ of between one hundred forty one thousandths of an inch and one hundred forty three thousandths of an inch (0.141"–0.143"). Also, the plug portion 42 defines a diameter $D_{pp}$ of between three thousand eight hundred twenty five ten thousandths of an inch and three thousand eight hundred thirty five ten thousandths of an inch (0.3825"–0.3835").

In contrast, the height $H_f$ of the flange 44 is between forty five thousandths of an inch and fifty thousandths of an inch (0.045"–0.050"), whereas the diameter $D_f$ of the flange 44 is between four hundred thirty five thousandths of an inch and four hundred thirty nine thousandths of an inch (0.435"–0.439"). In other words, the diameter of the flange 44 is equal to the diameter of the hole 17. Thus, the diameter $D_f$ of the flange 44 is greater than the diameter $D_{pp}$ of the plug portion 42.

Additionally, the shoulder portion 50 defines a height $H_{sh}$ of between sixty one thousandths of an inch and sixty three thousandths of an inch (0.061"–0.063"). The radius of curvature $R_{sh}$ of the surface 52 of the shoulder portion 50 is about fifty thousandths of an inch (0.050").

With the above-described combination of structure, the plug portion 42 of the plug 24 can be urged into the cup-shaped seal 19, with the flange 44 resting on the top lip 19*a* of the seal 19 in a tight interference fit with the wall of the hole 17. With the surface of the plug portion 42 oriented flush against the inside surface of the cup-shaped seal 19, and the flange 44 tightly abutting the wall of the hole 17, oil leakage through the hole 17 is prevented.

While the particular TOOL AND PLUG FOR BLOCKING ENGINE OIL GALLERY ACCESS HOLE as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. A tool for urging a plug into an access hole of an engine including a surface portion surrounding the access hole, comprising:

a base formed with a surface shaped to flushly abut the surface portion such that the base can be stably positioned against the surface portion over the access hole, the base having a generally box-like shape with a pair of open vertical sides adapted to provide access to the access hole; and an elongated urging member engaged with the base for movement between a first position, wherein the urging member is distanced from the access hole, and a second position, wherein the urging member is advanced into the access hole for urging the plug into the access hole to thereby seal the hole;

wherein the base includes a first side wall, a second side wall and a third side wall, said first, second and third side walls being oriented mutually orthogonal, the first and third side walls downwardly extending from the second side wall, the first side wall oriented adjacent to and perpendicular to the third side wall.

2. The tool of claim 1, wherein the urging member is threadably engaged with the base.

3. The tool of claim 1, wherein the second side wall includes an internally threaded aperture which receives the urging member.

4. The tool of claim 1, wherein the elongated urging member includes an enlarged head adapted to be manually grasped.

* * * * *